(12) United States Patent
Langouev et al.

(10) Patent No.: US 8,655,971 B2
(45) Date of Patent: Feb. 18, 2014

(54) BREAKING LOCKS HELD BY TWO-PHASE COMMIT TRANSACTIONS WHILE PRESERVING DATA CONSISTENCY

(75) Inventors: Ilia Langouev, Santa Cruz, CA (US); Ryan David Gallagher, Sunnyvale, CA (US); Aleksey Vasilyevich Pershin, Fremont, CA (US); Maria Basmanova, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 215 days.

(21) Appl. No.: 13/108,726

(22) Filed: May 16, 2011

(65) Prior Publication Data

US 2012/0297005 A1    Nov. 22, 2012

(51) Int. Cl.
*G06F 15/16* (2006.01)

(52) U.S. Cl.
USPC .......................................... 709/207

(58) Field of Classification Search
USPC ......... 709/207, 205, 209, 210, 211, 229, 244, 709/252
See application file for complete search history.

(56) References Cited

U.S. PATENT DOCUMENTS 7,478,400 B1 *   1/2009   Banerjee et al. ............... 719/313
2009/0271655 A1 * 10/2009   Hotta et al. ....................... 714/4

* cited by examiner

*Primary Examiner* — Mark Rinehart
*Assistant Examiner* — Ellen A Kirillova

(57) ABSTRACT

A technique for breaking locks held by two-phase commit (2PC) transactions while preserving data consistency that guarantees that either the "commit" phase or the "abort" phase of the 2PC protocol is completed at a higher-priority server. Accordingly, all locks on data objects are released and a high-priority operation can proceed. Data consistency is also preserved because the 2PC coordinator adheres to the 2PC protocol and properly notifies both the higher-priority server and one or more lower-priority servers when they are available.

24 Claims, 7 Drawing Sheets

BREAKING LOCKS HELD BY TWO-PHASE COMMIT TRANSACTIONS WHILE PRESERVING DATA CONSISTENCY

BACKGROUND

The two-phase commit (2PC) protocol is a known technique for coordinating updates in a computer networking environment. FIG. 1A illustrates a system 100 for implementing the 2PC protocol, according to the prior art. A system that implements the 2PC protocol can include N nodes, each of which includes a representation of the same data. In the example in FIG. 1A, two nodes are represented as servers 102A, 102B. Each server 102A, 102B has access to a separate data store 106A, 106B, respectively, that includes a representation of the same data.

The data accessible by each server 102A, 102B is updated so that the data remains consistent, regardless of any node or network failures in the system 100. To achieve this result, the 2PC protocol implements a 2PC coordinator 104. As shown in FIG. 1A, the 2PC coordinator 104 is a separate entity from the servers 102A, 102B and is connected to the servers 102A, 102B with a network (not shown).

When implementing the 2PC protocol, the 2PC coordinator 104 receives an instruction to perform a transaction from one of the servers 102A, 102B. In response, the 2PC coordinator 104 initiates the "prepare" phase of the 2PC protocol. During the prepare phase, the 2PC coordinator 104 transmits a message to each server that includes the details of the transaction. When a server receives the "prepare" message, the server evaluates the proposed change and replies back to the 2PC coordinator 104 with a message that indicates whether the server agrees to perform the transaction. This reply message is referred to as a "vote."

Once the 2PC coordinator 104 receives replies from all of the servers, the 2PC coordinator 104 decides whether to proceed with the transaction. If all servers voted "YES," (i.e., agreed to the transaction), then the 2PC coordinator 104 initiates the "commit" phase of the 2PC protocol. During the commit phase, the 2PC coordinator 104 transmits a message to each server requesting the server to modify the data according to the transaction. When a server receives the "commit" message, the server updates its copy of the data. According to the 2PC protocol, once the server receives the commit message, the server is required to perform the transaction (i.e., the server is not allowed to fail and the transaction is guaranteed).

If, however, one or more servers did not agree to the transaction and voted "NO" during the prepare phase, then the 2PC coordinator 104 initiates the "abort" phase of the 2PC protocol. During the abort phase, the 2PC coordinator 104 transmits a message to each server that voted "YES" to the transaction, instructing the server to discard whatever temporary information the server has stored during the "prepare" phase. Servers that voted "NO" to the transaction during the "prepare" phase do not receive the "abort" message. When a server receives the "abort" message, the server discards whatever temporary information the server stored during the "prepare" phase.

However, there are several problems associated with the 2PC protocol. For example, it is a known problem that if the 2PC coordinator 104 crashes or is otherwise unavailable after the "prepare" phase has started, then the transaction will never be committed or rolled back. It is customary for servers to lock the shared data in the "prepare" phase and release the locks on the data during the "commit" or "abort" phase. These locks are used to guarantee that the data is not changed after the "prepare" phase has started in such a way that the "commit" phase may fail. If the 2PC coordinator never completes the transaction, these locks on the data may never be released, essentially blocking any further updates to the shared data.

FIG. 1B is a timing diagram illustrating one problem with the two-phase commit protocol, according to the prior art. As shown, time t increases from left to right. At time $t_1$, a server receives a "prepare" message from the 2PC coordinator. At time $t_2$, the server locks the data 110 associated with the prepare message. At time $t_3$, the server sends a "YES" vote to the 2PC coordinator indicating that the server is able to complete the transaction. At this point, the server is waiting to receive either a "commit" message or an "abort" message from the 2PC coordinator. However, assume that at time $t_4$, another server crashes and never returns a vote to the 2PC coordinator. The server that responded YES continues to wait indefinitely for a message from the 2PC coordinator, and the data 110 remains locked indefinitely.

To overcome these drawbacks, some prior techniques implement a timeout procedure to release locks on data. If one of the servers does not reply with a vote in response to the prepare message within the timeout period, the 2PC coordinator presumes the server has failed and aborts the transaction. However, this technique works only if the 2PC coordinator is still available. If a server needs to abort a transaction without the 2PC coordinator, the server itself could implement a timeout procedure of its own, but this could lead to severe data inconsistencies between servers.

Accordingly, there remains a need for a technique for breaking locks held by two-phase commit transactions while preserving data consistency that overcomes the drawbacks discussed above.

SUMMARY

One or more embodiments provide for dedicating a single high-priority server that can access the data associated with a transaction even when the data was locked by a 2PC transaction. This dedication can be either global (i.e., for all objects) or object-specific (i.e., different servers for different objects). The other servers participating in the transaction are referred to as low-priority servers, of which there are one or more. When the transaction starts, the 2PC coordinator is forced to reside on the high-priority server. Each transaction is tagged with identifiers (IDs) of objects involved in the transaction. When the high-priority server needs to access a particular object for a higher priority operation than the 2PC transactions, then the high-priority server asks the 2PC coordinator to block any new transactions tagged with the object's ID, and to commit or abort all pending transactions tagged with the object's ID. For each pending transaction tagged with the object's ID, the 2PC coordinator either commits the transaction (i.e., if all votes have been received from each of the low-priority servers) or aborts the transaction (i.e., if some votes have not come in yet from one or more low-priority servers). If the high-priority server receives the commit message, the high-priority server completes the commit phase before continuing on with the high priority operation without waiting on the completion of the transaction from any low-priority servers. If the high-priority server receives the abort message, the high-priority server performs the abort phase to return its data to the previous consistent state before performing the high-priority operation without waiting on the completion of the transaction from any low-priority servers.

One or more embodiments provide a method for breaking locks held by a two-phase commit transaction while preserving data consistency. The method includes transmitting a first message to prepare for a transaction associated with a data object to each of two or more servers that include one or more lower-priority servers and a higher-priority server, where each of the two or more servers is associated with a separate representation of the data object; monitoring for reply messages from the one or more lower-priority servers in response to receiving the first message, where the reply messages from a lower-priority server indicates whether the lower-priority server is able to complete the transaction associated with the data object; if a reply message has not been received from at least one of the lower-priority servers in response to the first message, transmitting a second message to the higher-priority server that causes the higher-priority server to leave the data object associated with the higher-priority server unmodified; and if a reply message is received from each of the lower-priority servers, transmitting a third message to the higher-priority server that causes the higher-priority server to modify the representation of the data object associated with the higher-priority server.

One or more embodiments provide a method for breaking locks held by a two-phase commit transaction while preserving data consistency. The method includes receiving a request to perform a higher-priority operation associated with a data object; transmitting a request to a two-phase commit (2PC) coordinator to block any new transactions associated with a tag that corresponds to the data object; transmitting a request to the 2PC coordinator to commit or abort any pending transactions having a tag associated with the data object; and receiving a message from the 2PC coordinator, wherein, if the message is a commit message, updating the data object and performing the higher-priority operation using the updated data object, and, if the message is an abort message, leaving the data object unmodified and performing the higher-priority operation using the unmodified data object.

DETAILED DESCRIPTION

Figure 1A:
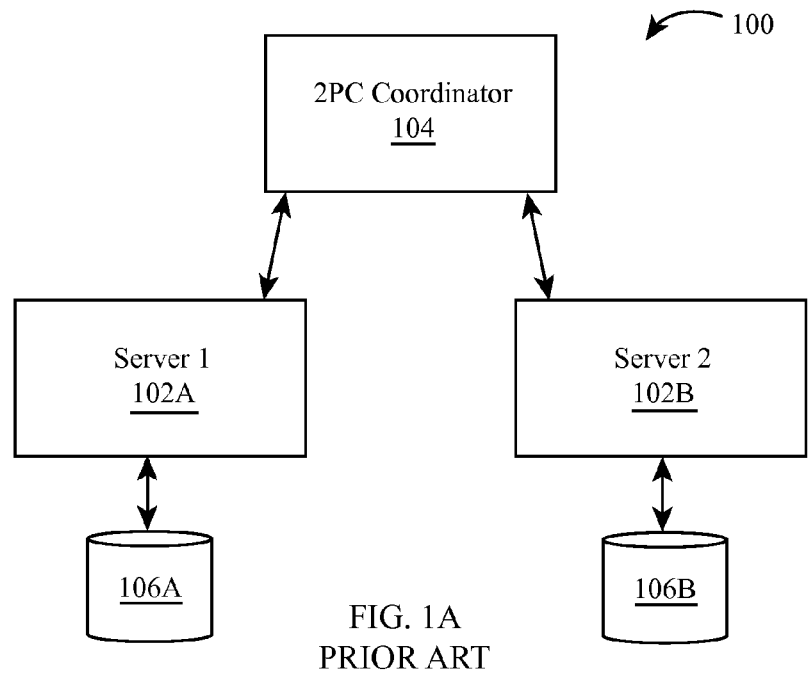
FIG. 1A illustrates a system for implementing the two-phase commit protocol, according to the prior art.
Figure 1B:
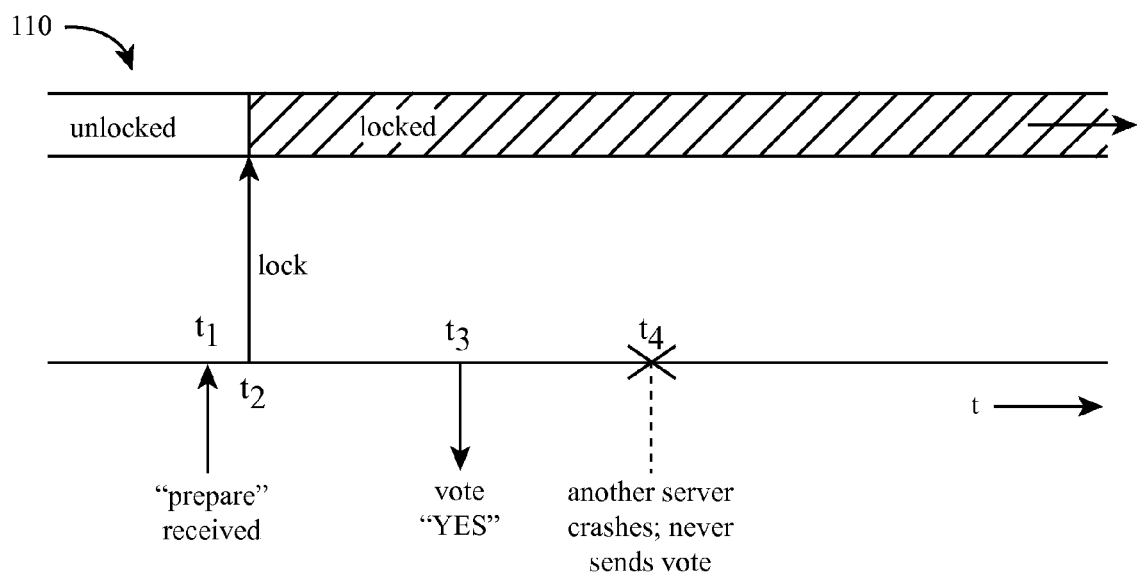
FIG. 1B is a timing diagram illustrating one problem with the two-phase commit protocol, according to the prior art.
Figure 2A:
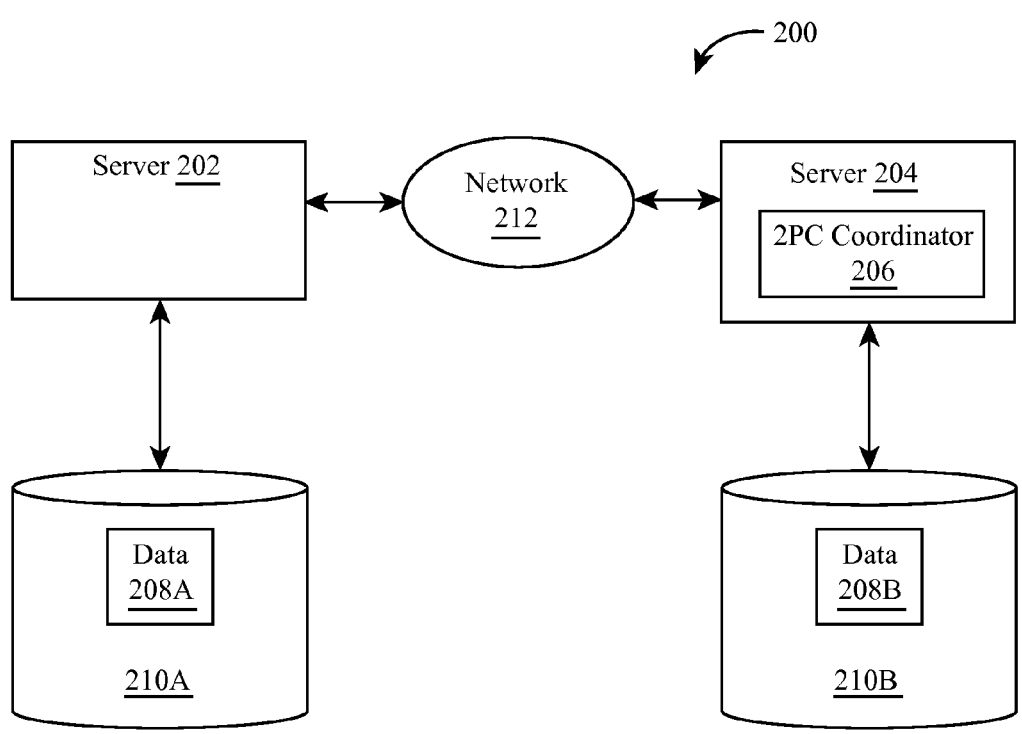
FIGS. 2A-2B illustrate systems for implementing a modified two-phase commit protocol, according to various embodiments of the invention.

FIG. 2A illustrates a system 200 for implementing a modified two-phase commit protocol, according to one embodiment of the invention. As shown, servers 202, 204 are connected via network 212. Network 212 may be any configuration, such as a local area network (LAN), or private or publicly accessible wide area network (WAN), such as the Internet. Server 202 is connected to data storage 210A, and server 204 is connected to data storage 210B. Data storage 210A includes data 208A and data storage 210B includes data 208B. Data 208A and data 208B are representations of the same data. For example, the data 208A, 208B may represent an amount of funds included in a bank account. In various embodiments, the data structures that include the data 208A, 208B may be same or may be different, so long as the information represented by the data structures is consistent. A 2PC coordinator 206 is executed on the server 204. The 2PC coordinator 206 can implement the 2PC protocol (or variants thereof) to ensure that the data 208A and the data 208B remain consistent. As described in greater detail below, the 2PC coordinator 206 can be configured to transmit messages to server 202 and/or server 204 to "break locks" on data objects and return either the original data object or a modified data object.

Figure 2B:
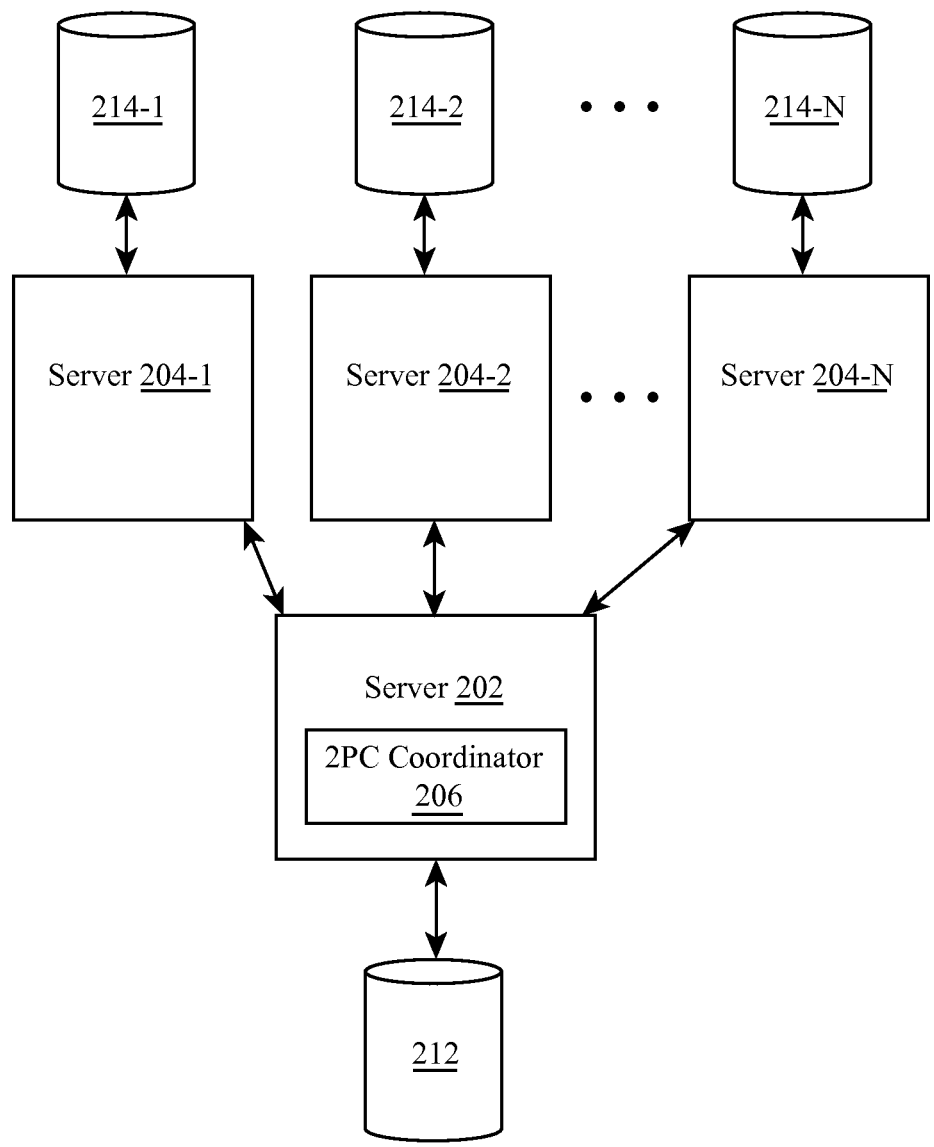

Although FIG. 2A shows only two servers that are running the 2PC protocol or a variant thereof, other embodiments include more than two servers that are running the 2PC protocol or a variant thereof. FIG. 2B illustrates a server 202 and a plurality of additional servers 204-1, 204-2, 204-N, according to one embodiment of the invention. As shown, each of the servers 204-1, 204-2, 204-N is coupled to a data store 214-1, 214-2, 214-N, respectively. Server 202 is coupled to data store 212. A 2PC coordinator 206 is implemented at the server 202 and is configured to maintain data consistency between the data stores 214-1, 214-2, 214-N coupled to the servers 204-1, 204-2, 204-N and the data store 212 coupled to the server 202. For example, the 2PC coordinator 206 may implement the 2PC protocol or a variant thereof.

Figure 3:
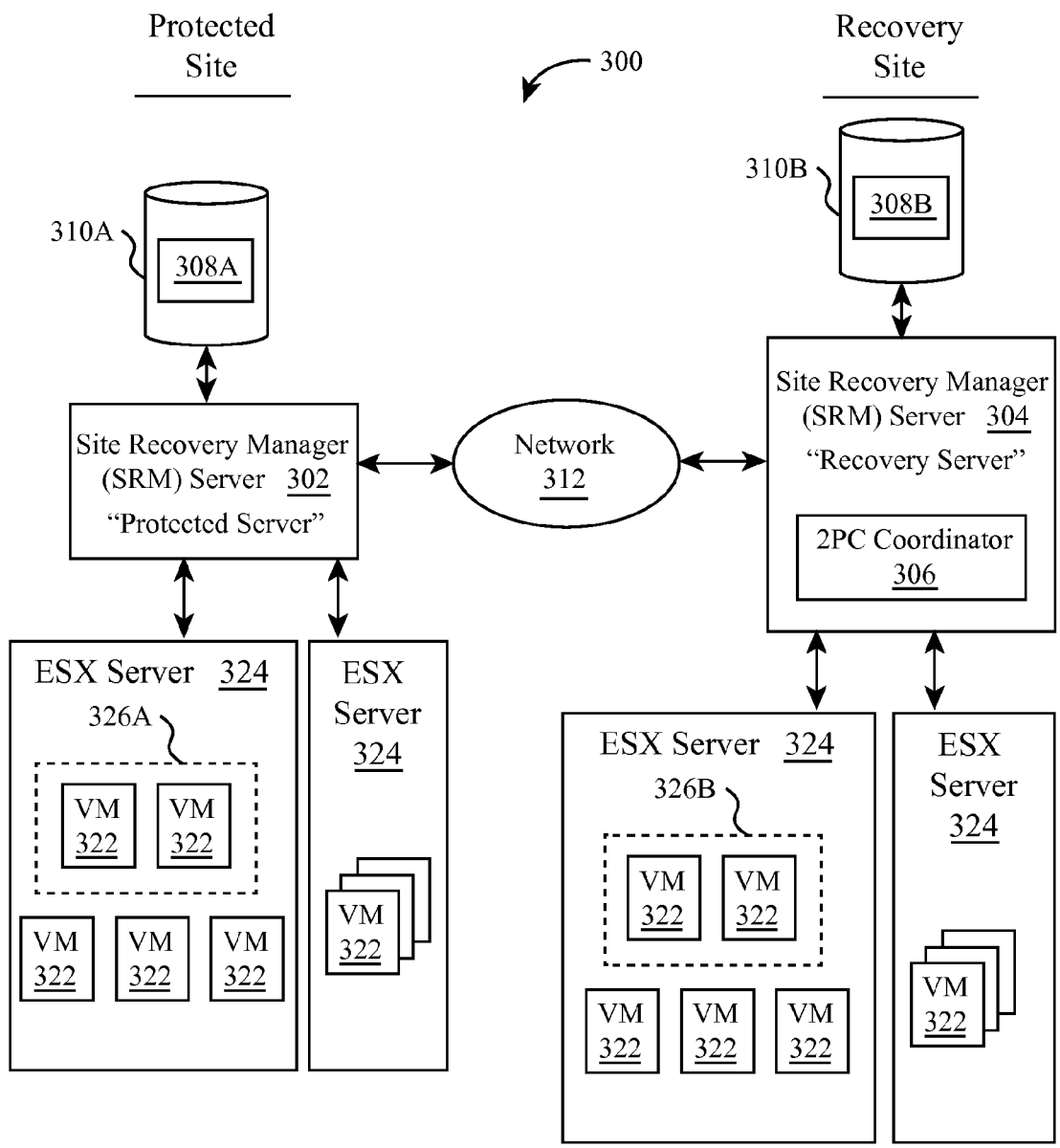
FIG. 3 illustrates a system that includes a high-priority site labeled "recovery site" and a low-priority site labeled "protected site," according to one embodiment of the invention.

In some embodiments, the servers included in the system may be part of a virtualized computing environment that is configured to implement a disaster recovery procedure. FIG. 3 illustrates a system that includes a high-priority site labeled "recovery site" and a low-priority site labeled "protected site," according to one embodiment of the invention. The protected site includes a server 302 and the recovery site includes a server 304. Each server 302, 304 may comprise a Site Recovery Manager (SRM) server provided by VMware, Inc.® SRM server 302 is connected to data storage 310A that includes data 308A, and SRM server 304 is connected to data storage 310B that includes data 308B. In some embodiments, the data storage 310A is included within the SRM server 302, and/or the data storage 310B is included within the SRM server 304.

In one embodiment, the SRM server 302 is referred to as a "protected server" and the SRM server 304 is referred to as a "recovery server." Besides the SRM server, each of the protected site and recovery site can also include multiple servers 324 (for example, ESX servers from VMware, Inc.®) that each run one or more virtual machines (VMs) 322. Each server 324 executes a hypervisor supporting a virtual machine execution space within which the VMs 322 can be executed. The data 308A, 308B stored in the data storage 310A, 310B, respectively, includes data objects that represent the VMs 322 executing in the servers 324. In some embodiments, the VMs 322 can be organized into logical groups, such as group 326A and group 326B, and the data 308A, 308B stored in the data storage 310A, 310B, respectively, represents the groups of VMs.

As shown in FIG. 3, the VMs on the protected site can be replicated to the recovery site for disaster recovery and can be recovered from the recovery site when the protected site fails. In some embodiments, disaster recovery refers to a situation where the entire protected site fails, such as during a flood, a power outage, or other disaster scenario. Failures of individual servers 324 at the protected site can be handled in a different way using a different recovery procedure. In disaster recovery, when the protected site fails, the VMs can be quickly powered on at the recovery site. In addition, the VMs can be moved to the recovery site when the protected site is available due to other reasons, such as planned maintenance and others.

The SRM server 304 includes a 2PC coordinator 306 configured to implement the 2PC protocol or a variant thereof. As described above, when implementing the 2PC protocol, an object that is being updated is locked during the prepare phase and remains locked until after the commit phase has completed or until an abort is received from the 2PC coordinator. However, if a recovery procedure to recover one or more VMs, or some other high-priority procedure, is initiated from the recovery site while a certain data object is locked, then the 2PC coordinator 306 needs to determine quickly how to return the data object. More specifically, the SRM server 304 may need to "break the lock" on the data object and perform the high-priority procedure using either an updated version of the data object (i.e., as if the commit phase had completed without any issues), or the original, unmodified version of the object (i.e., as if an abort message had been received from the 2PC coordinator 306). Embodiments of the invention describe a technique by which the server 304 can "break the lock" on a object at the recovery site and access the data object. Importantly, if the 2PC coordinator 306 were placed at the protected site, and the protected site was unavailable, then the state of transaction involving the data object would be unknown and recovery could not be performed properly.

Accordingly, embodiments of the invention force the 2PC coordinator 306 to be on the SRM server 304. In this manner, when a high-priority procedure is initiated and data is to be accessed from the recovery site, then the recovery server 310 is guaranteed to be available. Otherwise, if the recovery server 310 were unavailable, then recovery could not be completed in the first place.

It should be recognized that FIG. 3 shows a simplified representation of the system 300, which may include other components such as firewalls, connection brokers, and load balancers, as well as back-end storage networks, database servers, among others. Also, although the system 300 is described in the context of a recovery procedure, other high-priority operations are also within the scope of embodiments of the invention.

Figure 4:
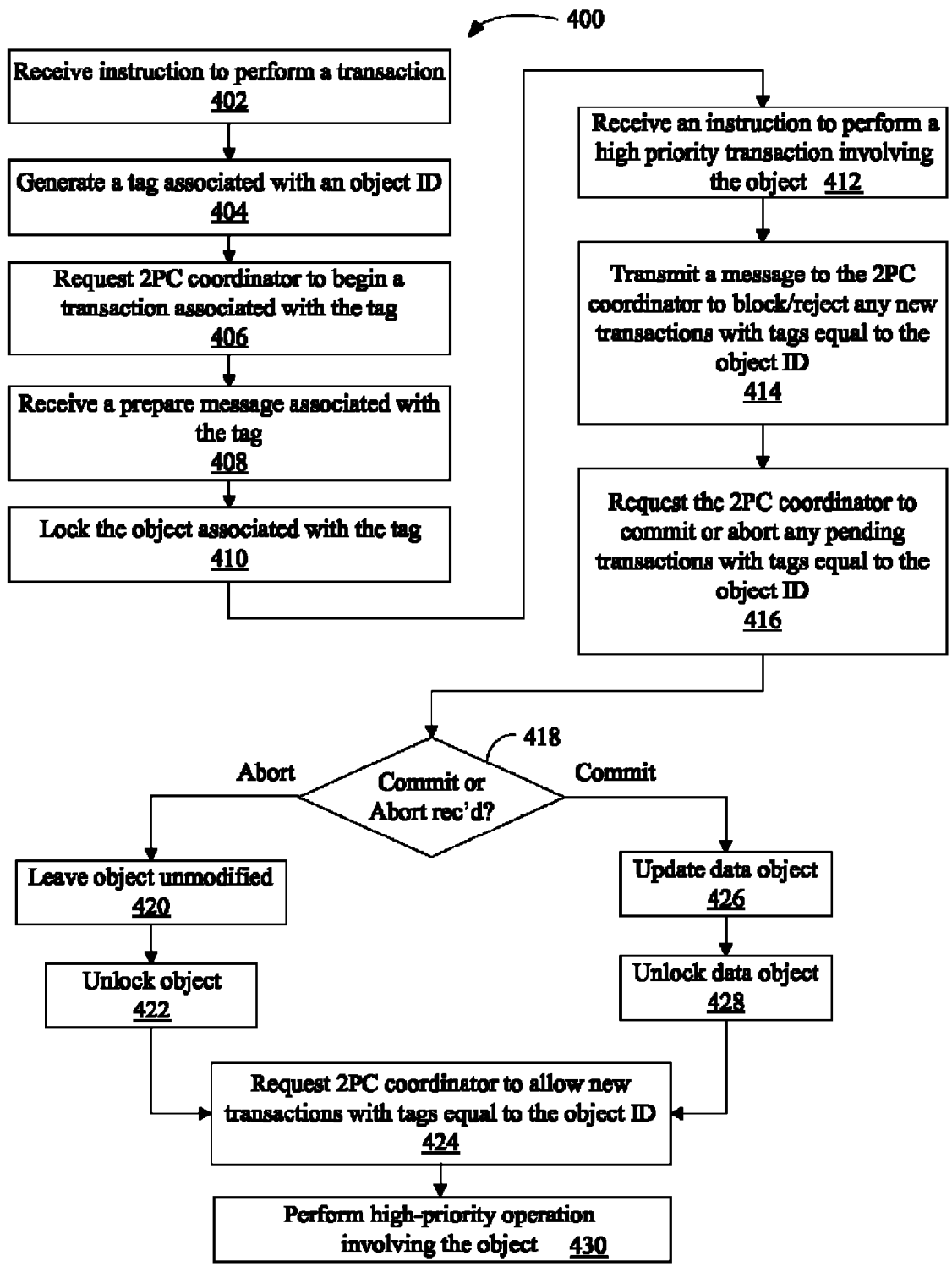
FIG. 4 is a flow diagram of method steps for performing a higher priority operation involving an object, according to one embodiment of the invention.

FIG. 4 is a flow diagram of method steps for performing a higher priority operation involving an object, according to one embodiment of the invention. It should be understood that, even though the method 400 is described in conjunction with the systems of FIGS. 1A, 2A, 2B and 3, any system may be configured to perform the method steps, in any suitable order.

As shown, the method 400 begins at step 402, where a server receives a request to perform a transaction involving a data object. The server can be any one of server 302 or server 304 shown in FIG. 3. In one embodiment, the protected server receives the request to perform the transaction. For example, the request may be generated based on some interaction by a user. At step 404, the protected server generates a tag associated with an object ID of the data object that would be modified during the transaction. In one implementation, the data object can represent an ID associated with a VM or an ID associated with a group of VMs. In other embodiments, the data object can represent any type of data.

At step 406, the protected server requests a 2PC coordinator to begin a transaction associated with the tag. In response to receiving the request to begin the transaction, the 2PC coordinator issues a "prepare" message to each server. At step 408, the recovery server receives a prepare message from the 2PC coordinator. The protected server also receives a prepare message. The prepare message includes a tag, which is ultimately associated with one or more objects. In response to receiving the prepare message, at step 410, the recovery server and the protected server lock the object associated with the tag included in the prepare message. Each of the protected server and the recovery server can then return a "vote" to the 2PC coordinator indicating whether the server is able to complete the transaction.

Before the transaction is complete, at step 412, the recovery server receives an instruction to perform a high-priority operation involving the object. For example, the high-priority operation may be a recovery operation. In one embodiment, the instruction to perform a recovery operation involving the object can be initiated by a user that wishes to perform a recovery operation. In other embodiments, the instruction to perform a recovery operation involving the object can be initiated automatically when the recovery site suspects that the protected site has failed.

At step 414, the recovery server transmits a message to the 2PC coordinator to block and/or reject any new transactions with tags associated with the object ID of the object involved in the high-priority operation. At step 416, the recovery server requests the 2PC coordinator to commit or abort any pending transactions with tags equal to the object ID. The steps illustrated in FIG. 5 below describe the actions of the 2PC coordinator in response to receiving the request to commit or abort any pending transactions with tags equal to the object ID. The 2PC coordinator returns either an "abort" or a "commit" command is response to the request.

At step 418, the recovery server determines whether the response from the 2PC coordinator is an abort message or a commit message. If the recovery server determines that the response from the 2PC coordinator is an abort message, then the method 400 proceeds to step 420. At step 420, the recovery server leaves the object unmodified, and at step 422, unlocks the object. At step 424, the recovery server requests the 2PC coordinator to allow new transactions with tags equal to the object ID.

If, at step 418, the recovery server determines that the response from the 2PC coordinator is a commit message, then the method 400 proceeds to step 426. At step 426, the recovery server updates the object in accordance with the transaction. At step 428, the recovery server unlocks the data object. The method 400 then proceeds to step 424, described above. From step 424, the method 400 proceeds to step 430, where the recovery server perform the high-priority operation using the object. The object is either updated or unmodified, depending on which branch of the method 400 is followed from step 418. Again, embodiments of the invention are not limited to a recovery operation involving a protected server and a recovery server, but can include any high-priority operation involving a lower priority server and a higher priority server.

Figure 5:
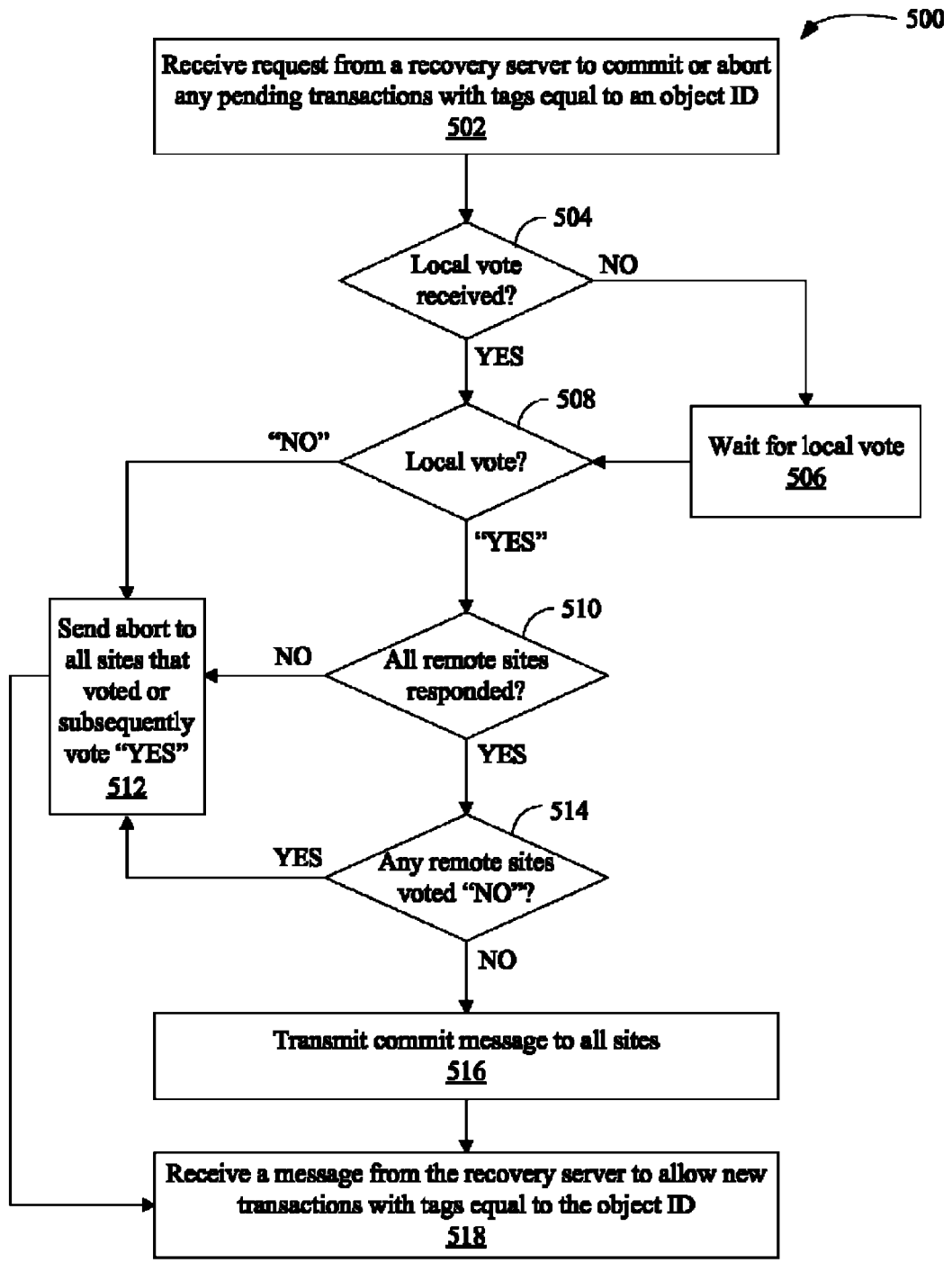
FIG. 5 is a flow diagram of method steps for breaking locks held by a two-phase commit transaction while preserving data consistency, according to one embodiment of the invention.

FIG. 5 is a flow diagram of method steps for breaking locks held by a two-phase commit transaction while preserving data consistency, according to one embodiment of the invention. It should be understood that, even though the method 500 is described in conjunction with the systems of FIGS. 1A, 2A, 2B and 3, any system may be configured to perform the method steps, in any suitable order.

At step 502, a 2PC coordinator receives a request from a recovery server (i.e., a higher priority server) to commit or abort any pending transactions with tags equal to the object ID. As previously described, the request may have been sent by the recovery server that received a request to recover a data object. The 2PC coordinator may be implementing a 2PC protocol or a variant thereof. As described in relation to FIG. 3, the 2PC coordinator resides at the recovery site. In one implementation, there is a single recovery site and one or more protected sites included in the distributed system.

When there are pending transactions for the given tags, at step 504, the 2PC coordinator determines whether the local vote in response to the prepare message has been received. The local vote is the vote of the recovery server that is local to the 2PC coordinator. If the 2PC coordinator determines that the local vote has not been received, then the method 500 proceeds to step 506, where the 2PC coordinator waits for the local vote from the recovery server. In most situations, the local vote is received relatively quickly (e.g., within a few milliseconds) since the local vote is coming from the recovery server on which the 2PC coordinator is executing. Once the local vote is received, the method proceeds to step 508.

If, at step 504, the 2PC coordinator determines that the local vote has been received, then the method 500 proceeds to step 508. At step 508, the 2PC coordinator determines whether the local vote from the recovery server is "YES" or "NO." A vote of YES indicates that the recovery server is able to complete the transaction involving the data object, and a vote of NO indicates that the recovery server is not able to complete the transaction involving the data object. If the local vote is NO, then the method 500 proceeds to step 512, described below.

If, at step 508, the local vote is YES, then the method 500 proceeds to step 510. At step 510, the 2PC coordinator determines whether any of the one or more protected servers has not yet responded with a vote in response to the prepare message. If the 2PC coordinator determines that at least one protected sites has not yet responded, then the method 500 proceeds to step 512.

At step 512, the 2PC coordinator transmits an abort message to each protected server that has voted or subsequently votes "YES" and to the recovery server, if the recover server voted "YES." If the recovery server voted "NO," then the recovery server would not have a lock on the data object involved. If the recovery server voted YES, then the recovery server receives the abort message, in response to which the recovery server unlocks the data object involved, as described in step 422 in FIG. 4. The 2PC coordinator does not wait for the protected servers to complete the abort procedure. By definition, the abort is not allowed to fail. However, the 2PC coordinator does wait for the local abort at the recover server to complete (which is assumed to be fast). The method 500 then proceeds to step 518, where the 2PC coordinator receives a message from a server to allow new transactions with the given tag that is equal to the object ID.

Referring back to step 510, if the 2PC coordinator determines that each of the protected sites has voted, then the method 500 proceeds to step 514. At step 514, the 2PC coordinator determines whether any of the protected sites has voted NO. If the 2PC coordinator determines that one or more of the of the protected sites has voted NO, then the method 500 proceeds to step 512, where an abort message is transmitted, the local lock at the recovery server is released, and the data object remains unmodified.

If, at step 514, the 2PC coordinator determines that all of the protected sites have voted YES, then the method 500 proceeds to step 516. At step 516, the 2PC coordinator transmits a commit message to all of the protected servers and to the recovery server. In response to receiving the commit message, the recovery server completes the transaction involving the data object and the lock on the data object is released after the transaction has completed, as described at steps 426, 428, 430 in FIG. 4. The 2PC coordinator does not wait for the protected servers to complete the commit procedure. By definition, the commit is not allowed to fail. However, the 2PC coordinator does wait for the commit at the recover server to complete (which is assumed to be fast). The method 500 then proceeds to step 518, described above.

The steps taken by the 2PC coordinator are summarized in Table 1.

TABLE 1

| Low-Priority Server Vote(s) "Protected Site(s)" | High-Priority Server Vote "Recovery Site" | Action |
|---|---|---|
| Not yet (not all sites voted) | Not yet | Wait for local vote |
| Yes or No | Not yet | Wait for local vote |
| Not yet (not all sites voted) | Yes | Abort the recovery site, abort protected sites if/when they vote Yes |
| Not yet (not all sites voted) | No | Abort protected sites if/when they vote Yes |
| Yes | Yes | Commit |

As shown in Table 1, if the high-priority server vote (i.e., the vote from the recovery site) is YES and at least one low-priority server has not yet responded, the transaction is aborted. Aborting the transaction in this state is different than the standard 2PC protocol, which would simply wait for all of the servers to vote. However, in a high-priority situation, such as a recovery situation, the data should be restored as quickly as possible, and waiting for all of the servers to vote may take too long or may never complete (if one of the servers is destroyed, e.g., by a natural disaster).

As also shown in Table 1, if the local vote is YES and all of the low-priority servers have also voted YES, then the commit phase is initiated and the transaction is allowed to complete. In this manner, the lock on the data object is released naturally by completing the transaction and not aborting the transaction prematurely.

To avoid obscuring embodiments of the invention, Table 1 does not include all combinations of the actions taken when the high-priority server vote or any of the low-priority server votes is a "NO" vote. If the high-priority server vote is NO or any of the low-priority server votes is NO, then the transaction is aborted. If all servers vote YES then the transaction is committed.

As also shown in rows 1 and 2 of Table 1, when the high-priority server vote has not yet been received, the 2PC coordinator waits for the high-priority server vote. Since the recovery site is guaranteed to be active (otherwise the 2PC coordinator would not be executing), the high-priority server vote is received relatively quickly. As stated in row 4 of Table 1, the transaction is aborted immediately if the high-priority server votes NO. When the high-priority server vote of YES is received, the state of transaction moves to either row 3 or row 5 of Table 1, depending on votes received from the protected sites.

Figure 6A:
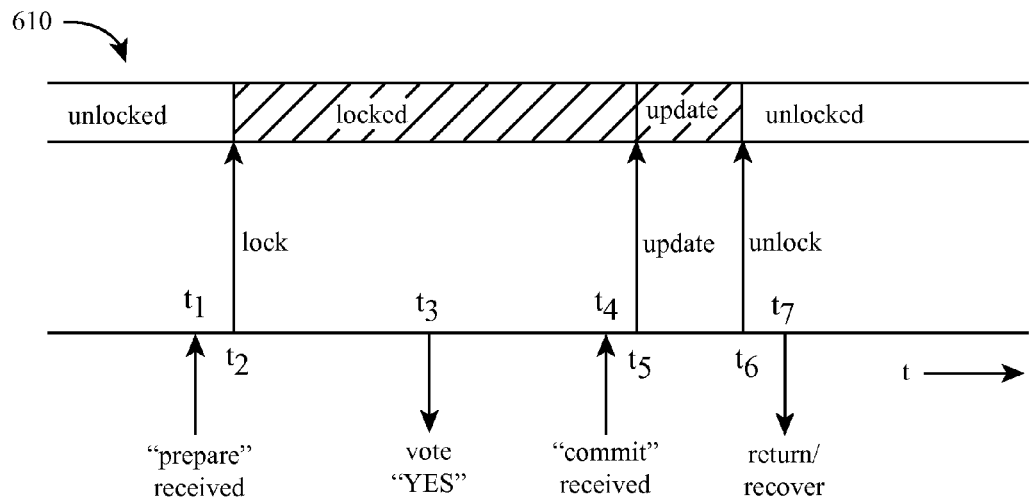
FIG. 6A is a timing diagram illustrating breaking the lock on a data object at a high-priority site by completing the commit phase of a transaction, according to one embodiment of the invention.

FIG. 6A is a timing diagram illustrating breaking a lock on a data object at a recovery site by completing the commit phase of a transaction, according to one embodiment of the invention. As shown, time t increases from left to right. At time $t_1$, the recovery site receives a "prepare" message from the 2PC coordinator. As described above, the 2PC coordinator is executing at the recovery site. At time $t_2$, the recovery site locks the data object 510 associated with the transaction. At time $t_3$, the recovery site sends a "YES" vote to the 2PC coordinator indicating that the recovery site is able to complete the transaction. Between the time $t_3$ when the recovery site sends the YES vote and a time $t_4$ when the commit message is received, the server receives a message to recover the data object. In accordance with FIGS. 4-5 and Table 1, if the 2PC coordinator determines that all of the protected sites have already voted YES, then the 2PC coordinator transmits the commit message to the recovery site (and all protected sites). At time $t_4$, the commit message is received by the recovery site. At time $t_5$, the recovery site begins to update the data object 610. When the update is complete, at time $t_6$, the data object 610 is unlocked. At time $t_7$, the 2PC coordinator returns to the server and the server starts the recovery process using the updated data object 610.

Figure 6B:
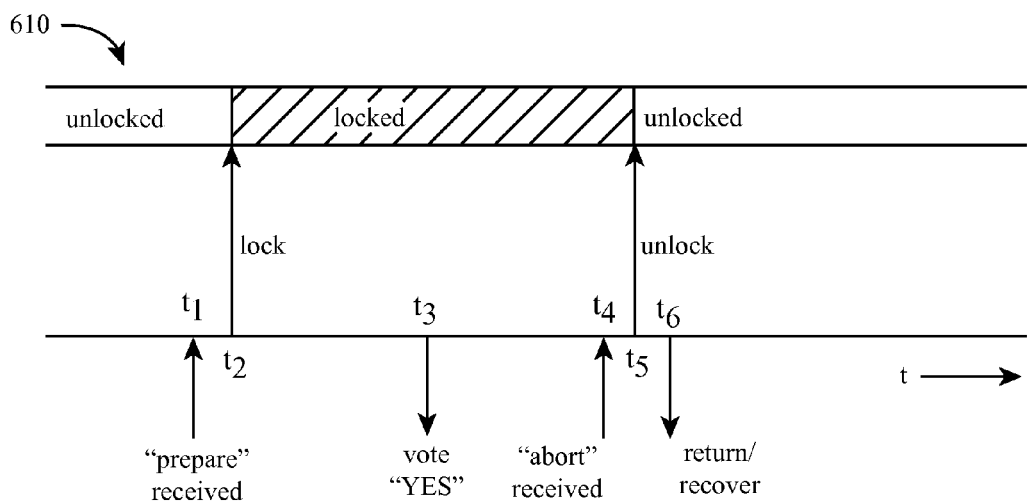
FIG. 6B is a timing diagram illustrating breaking the lock on a data object at a high-priority site by aborting a transaction, according to one embodiment of the invention.

FIG. 6B is a timing diagram illustrating breaking a lock on a data object at a recovery site by aborting a transaction, according to one embodiment of the invention. Similar to FIG. 6A, time t increases from left to right. At time $t_1$, the recovery site receives a "prepare" message from the 2PC coordinator. At time $t_2$, the recovery site locks the data object 610 associated with the transaction. At time $t_3$, the recovery site sends a "YES" vote to the 2PC coordinator indicating that the recovery site is able to complete the transaction. Between the time $t_3$ when the recovery site sends the YES vote and the time $t_4$ when the commit message is received, the server receives a message to recover the data object. However, at the time the recover message is received, one or more of the protected sites has not yet responded to the prepare message with a vote. In response to at least one of the protected sites not responding with a vote, the 2PC coordinator aborts the transaction (see, step 512 in FIG. 5). As shown in FIG. 6B, at time $t_4$, the abort message is received by the recovery site. At time $t_5$, the recovery site releases the lock on the data object 610 and the update is not performed. At time $t_6$, the 2PC coordinator returns to the server and the server starts the recovery process using the unmodified data object 610.

In sum, embodiments of the invention provide a technique for breaking locks held by 2PC transactions while preserving data consistency. In contrast to prior art techniques that can stall indefinitely, the disclosed technique guarantees that either the "commit" phase or the "abort" phase is completed locally at the recovery site. Accordingly, all locks on data objects are released and recovery can proceed. Data consistency is also preserved because the 2PC coordinator adheres to the 2PC protocol and properly notifies both the high-priority server and the low-priority servers when they are available.

Although the above techniques have been described in the context of VMware Site Recovery Manager (SRM) configured to recover VMs at a recovery site, the techniques can be generalized to abort any 2PC transactions, not necessarily SRM-specific transactions. The embodiments described herein are equally applicable to any system using the 2PC protocol where a single dedicated server is forced to execute the 2PC coordinator. For example, any system that includes non-2PC operations that have higher priority than standard 2PC operations, and such higher priority operations need to access the same objects as the standard 2PC operations, it is possible to dedicate a single server to run such operations and embodiments of the invention are applicable. Also, in various embodiments, the single server dedication may be either global (i.e., for all types of objects) or may be object-specific.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of embodiments of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for breaking locks held by a two-phase commit transaction while preserving data consistency, the method comprising:
    transmitting a first message to prepare for a transaction associated with a data object to each of two or more servers that include one or more lower-priority servers and a higher-priority server, wherein each of the two or more servers is associated with a separate representation of the data object;
    monitoring for reply messages from the one or more lower-priority servers in response to receiving the first message, wherein the reply messages from a lower-priority server indicates whether the lower-priority server is able to complete the transaction associated with the data object;
    if a reply message has not been received from at least one of the lower-priority servers in response to the first message, transmitting a second message to the higher-priority server that causes the higher-priority server to leave the data object associated with the higher-priority server unmodified; and
    if a reply message is received from each of the lower-priority servers, transmitting a third message to the higher-priority server that causes the higher-priority server to modify the representation of the data object associated with the higher-priority server;
    wherein the first, second, and third messages are transmitted from a two-phase commit (2PC) coordinator and the reply messages are monitored by the 2PC coordinator; and
    wherein the 2PC coordinator resides and executes on the higher-priority server.

2. The method of claim 1, wherein each of the lower-priority servers is configured to place a lock on a corresponding representation of the data object in response to receiving the first message.

3. The method of claim 1, wherein the first message comprises a prepare message, the second message comprises an abort message, and the third message comprises a commit message.

4. The method of claim 1, further comprising waiting for the reply message from the higher-priority server before transmitting either the second message or the third message to the higher-priority server.

5. The method of claim 1, wherein the data object is associated with a representation of a virtual machine or a set of virtual machines.

6. The method of claim 1, wherein if a reply message has not been received from at least one of the lower-priority servers in response to the first message, further comprising: transmitting the second message to each of the lower-priority servers that has responded with a reply message indicating that the lower-priority server is able to complete the transaction associated with the data object.

7. The method of claim 1, wherein if a reply message is received from each of the lower-priority servers, determining that each reply indicates that the corresponding lower-priority server is able to complete the transaction associated with the data object prior to transmitting the third message to the higher-priority server.

8. The method of claim 1, wherein the higher-priority server is configured to perform a recovery operation in response to receiving the second message or third message.

9. A method for breaking locks held by a two-phase commit transaction while preserving data consistency, the method comprising:
    establishing a priority amongst a group of servers that defines a higher-priority server and one or more lower-priority servers, wherein each of the two or more servers is associated with a separate representation of a data object;
    receiving, at the higher-priority server, a request to perform a higher-priority operation associated with the data object;
    transmitting, from the higher-priority server, a request to a two-phase commit (2PC) coordinator to block any new transactions associated with a tag that corresponds to the data object;
    transmitting, from the higher-priority server, a request to the 2PC coordinator to commit or abort any pending transactions having a tag associated with the data object; and
    receiving a message from the 2PC coordinator at the higher-priority server, wherein
    if the message is a commit message, updating the data object and performing the higher-priority operation using the updated data object, and
    if the message is an abort message, leaving the data object unmodified and performing the higher-priority operation using the unmodified data object;
    wherein the 2PC coordinator resides and executes on the higher-priority server.

10. The method of claim 9, wherein the data object is associated with one or more virtual machines.

11. The method of claim 9, wherein the 2PC coordinator is executed on a recovery site server.

12. The method of claim 9, wherein the higher-priority operation comprises a recovery operation.

13. A non-transitory computer-readable storage medium comprising instructions that, when executed in a computing device, enable a technique for breaking locks held by a two-phase commit transaction while preserving data consistency, by performing the steps of:
    transmitting a first message to prepare for a transaction associated with a data object to each of two or more servers that include one or more lower-priority servers and a higher-priority server, wherein each of the two or more servers is associated with a separate representation of the data object;
    monitoring for reply messages from the one or more lower-priority servers in response to receiving the first message, wherein the reply messages from a lower-priority server indicates whether the lower-priority server is able to complete the transaction associated with the data object;

if a reply message has not been received from at least one of the lower-priority servers in response to the first message, transmitting a second message to the higher-priority server that causes the higher-priority server to leave the data object associated with the higher-priority server unmodified; and if a reply message is received from each of the lower-priority servers, transmitting a third message to the higher-priority server that causes the higher-priority server to modify the representation of the data object associated with the higher-priority server;

wherein the first, second, and third messages are transmitted from a two-phase commit (2PC) coordinator and the reply messages are monitored by the 2PC coordinator; and wherein the 2PC coordinator resides and executes on the higher-priority server.

14. The computer-readable storage medium of claim 13, wherein each of the lower-priority servers is configured to place a lock on a corresponding representation of the data object in response to receiving the first message.

15. The computer-readable storage medium of claim 13, wherein the first message comprises a prepare message, the second message comprises an abort message, and the third message comprises a commit message.

16. The computer-readable storage medium of claim 13, further comprising waiting for the reply message from the higher-priority server before transmitting either the second message or the third message to the higher-priority server.

17. The computer-readable storage medium of claim 13, wherein the data object is associated with a representation of a virtual machine or a set of virtual machines.

18. The computer-readable storage medium of claim 13, wherein if a reply message has not been received from at least one of the lower-priority servers in response to the first message, further comprising: transmitting the second message to each of the lower-priority servers that has responded with a reply message indicating that the lower-priority server is able to complete the transaction associated with the data object.

19. The computer-readable storage medium of claim 13, wherein if a reply message is received from each of the lower-priority servers, determining that each reply indicates that the corresponding lower-priority server is able to complete the transaction associated with the data object prior to transmitting the third message to the higher-priority server.

20. The computer-readable storage medium of claim 13, wherein the higher-priority server is configured to perform a recovery operation in response to receiving the second message or third message.

21. A non-transitory computer-readable storage medium comprising instructions that, when executed in a computing device, enable a technique for breaking locks held by a two-phase commit transaction while preserving data consistency, by performing the steps of:

establishing a priority amongst a group of servers that defines a higher-priority server and one or more lower-priority servers, wherein each of the two or more servers is associated with a separate representation of a data object;

receiving, at the higher-priority server, a request to perform a higher-priority operation associated with the data object;

transmitting, from the higher-priority server, a request to a two-phase commit (2PC) coordinator to block any new transactions associated with a tag that corresponds to the data object;

transmitting, from the higher-priority server, a request to the 2PC coordinator to commit or abort any pending transactions having a tag associated with the data object; and receiving a message from the 2PC coordinator at the higher-priority server, wherein if the message is a commit message, updating the data object and performing the higher-priority operation using the updated data object, and if the message is an abort message, leaving the data object unmodified and performing the higher-priority operation using the unmodified data object;

wherein the 2PC coordinator resides and executes on the higher-priority server.

22. The computer-readable storage medium of claim 21, wherein the data object is associated with one or more virtual machines.

23. The computer-readable storage medium of claim 21, wherein the 2PC coordinator is executed on a recovery site server.

24. The computer-readable storage medium of claim 21, wherein the higher-priority operation comprises a recovery operation.

* * * * *